United States Patent
Zhou

(10) Patent No.: US 12,315,184 B2
(45) Date of Patent: May 27, 2025

(54) HEIGHT DETERMINING METHOD AND APPARATUS

(71) Applicant: SHENZHEN YINWANG INTELLIGENT TECHNOLOGIES CO., LTD., Shenzhen (CN)

(72) Inventor: Wei Zhou, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 362 days.

(21) Appl. No.: 17/843,535

(22) Filed: Jun. 17, 2022

(65) Prior Publication Data

US 2022/0327723 A1    Oct. 13, 2022

Related U.S. Application Data

(63) Continuation of application No. PCT/CN2020/135002, filed on Dec. 9, 2020.

(30) Foreign Application Priority Data

Dec. 19, 2019   (CN) .......................... 201911319109.0

(51) Int. Cl.
*G06T 7/60*    (2017.01)
*B60W 40/06*   (2012.01)
(Continued)

(52) U.S. Cl.
CPC .............. *G06T 7/60* (2013.01); *B60W 40/06* (2013.01); *B60W 40/12* (2013.01);
(Continued)

(58) Field of Classification Search
CPC ... G06T 7/60; G06T 7/70; G06T 2207/30242; G06T 2207/30256; B60W 40/06; B60W 40/12; B60W 60/0015; B60W 2420/403; B60W 2552/50; B60W 2552/53; B60W 40/02; B60W 50/14; B60W 2050/146; G06V 20/58; G06V 20/588; G08G 1/165
(Continued)

(56) References Cited

U.S. PATENT DOCUMENTS 6,674,394 B1    1/2004 Zoratti
2014/0292554 A1   10/2014 Smith et al.
(Continued)

FOREIGN PATENT DOCUMENTS

CN    200950303    *  9/2007
CN    202142189    *  2/2012
(Continued)

OTHER PUBLICATIONS

Office Action in Chinese Appln. No. 201911319109.0, dated Feb. 11, 2022, 15 pages (with English translation).
(Continued)

*Primary Examiner* — Jerome Grant, II
(74) *Attorney, Agent, or Firm* — Fish & Richardson P.C.

(57) ABSTRACT

The disclosure provides methods and apparatuses for determining a height of a road target in a driving process. One example method includes determining a target object on a road, and determining a height threshold of the road based on the target object, to obtain a maximum allowed height of the road.

20 Claims, 8 Drawing Sheets

(51) Int. Cl.
*B60W 40/12* (2012.01)
*B60W 60/00* (2020.01)
*G06T 7/70* (2017.01)
*G06V 20/56* (2022.01)
*G06V 20/58* (2022.01)

(52) U.S. Cl.
CPC ........... *B60W 60/0015* (2020.02); *G06T 7/70* (2017.01); *G06V 20/58* (2022.01); *G06V 20/588* (2022.01); *B60W 2420/403* (2013.01); *B60W 2552/50* (2020.02); *B60W 2552/53* (2020.02); *G06T 2207/30242* (2013.01); *G06T 2207/30256* (2013.01)

(58) Field of Classification Search
USPC ........................................................ 382/106
See application file for complete search history.

(56) References Cited

U.S. PATENT DOCUMENTS

| | | | |
|---|---|---|---|
| 2016/0009280 A1 | 1/2016 | Tokimasa et al. | |
| 2020/0081121 A1* | 3/2020 | Singhal | G01S 17/86 |

FOREIGN PATENT DOCUMENTS

| | | | | |
|---|---|---|---|---|
| CN | 105047020 A | | 11/2015 | |
| CN | 105718870 A | | 6/2016 | |
| CN | 105893960 A | | 8/2016 | |
| CN | 107662541 A | | 2/2018 | |
| CN | 108216242 A | | 6/2018 | |
| CN | 1058112532 | * | 7/2018 | .............. H02G 3/22 |
| CN | 108657176 A | | 10/2018 | |
| CN | 208136765 | * | 11/2018 | |
| CN | 110194160 A | | 9/2019 | |
| CN | 110341621 A | | 10/2019 | |
| CN | 110544379 A | | 12/2019 | |
| DE | 102016121428 | * | 5/2018 | ............. B60K 28/08 |
| JP | 1062162 | * | 3/1998 | |
| JP | 2018181272 A | | 11/2018 | |
| KR | 101687073 B1 | | 12/2016 | |
| TR | 201717141 | * | 11/2017 | |
| WO | 2019183981 A1 | | 10/2019 | |

OTHER PUBLICATIONS

Extended European Search Report in European Appln No. 20904137.5, dated Jan. 30, 2023, 6 pages.

International Search Report and Written Opinion in International Appln. No. PCT/CN2020/135002, mailed on Feb. 25, 2021, 17 pages (with English translation).

* cited by examiner

HEIGHT DETERMINING METHOD AND APPARATUS

CROSS-REFERENCE TO RELATED APPLICATIONS

This application is a continuation of International Application No. PCT/CN2020/135002, filed on Dec. 9, 2020, which claims priority to Chinese Patent Application No. 201911319109.0, filed on Dec. 19, 2019. The disclosures of the aforementioned applications are hereby incorporated by reference in their entireties.

TECHNICAL FIELD

This application relates to the field of vehicle driving technologies, and in particular, to a height determining method and apparatus.

BACKGROUND

In assisted driving and automated driving scenarios, a vehicle needs to sense a surrounding driving environment, to provide a basis for normal driving of the vehicle. In particular, with the development of cities and construction of roads, new interchanges and tunnels spring up, where a height of a vehicle is limited in travel sections of the interchanges and tunnels. Therefore, to ensure normal driving of the vehicle, during sensing of the surrounding driving environment, a maximum allowed height of a road needs to be sensed and obtained.

In a conventional technology, a millimeter-wave radar is usually disposed on a vehicle to obtain a maximum allowed height of a road, so that when the vehicle passes through a height restriction barrier, an underbridge, and a tunnel, the millimeter-wave radar can collect reflection point data, which includes effective reflection point data and ineffective reflection point data, and determine the maximum allowed height of the road based on the reflection point data. The effective reflection point data may be understood as data which is helpful to calculate the maximum allowed height of the road, and the ineffective reflection point data may be understood as data which has no effect on calculating the maximum allowed height of the road. During determining of the maximum allowed height of the road based on the reflection point data, if the data used to calculate the maximum allowed height of the road includes ineffective reflection point data, accuracy of the calculated maximum allowed height of the road is low. In addition, even if all of the data used to calculate the maximum allowed height of the road is effective reflection point data, accuracy of the calculated maximum allowed height of the road may also be low due to limited detection precision of the millimeter-wave radar.

Therefore, how to improve accuracy of the obtained maximum allowed height during determining of the maximum allowed height of the road is an urgent problem to be resolved by a person skilled in the art.

SUMMARY

Embodiments of this application provide a height determining method and apparatus, to improve accuracy of an obtained maximum allowed height of a road during determining of the maximum allowed height.

According to a first aspect, an embodiment of this application provides a height determining method. The height determining method may include:
  determining a target object on a road; and
  determining a height threshold of the road based on the target object, where the height threshold is used to indicate a maximum allowed height of the road.

It can be understood that in this embodiment of this application, the target object may be understood as an object for determining a road clearance (clearance), for example, a height restriction barrier, a rectangular underbridge, or a rectangular tunnel entrance. The target object may alternatively be understood as some objects by which the road clearance cannot be determined, for example, an arched underbridge or an arched tunnel entrance. This embodiment of this application herein is described by merely using an example that the target object may include at least one of a height restriction barrier, an underbridge, a tunnel entrance, and a parking barrier, but this does not mean that this embodiment of this application is limited thereto.

It can be learned that, during determining of the height threshold of the road in this embodiment of this application, the target object on the road is first determined, and the height threshold of the road is determined based on the target object, to obtain the maximum allowed height of the road. Compared with a conventional technology in which a millimeter-wave radar with limited detection precision is used and cannot obtain an accurate maximum allowed height, the height determining method effectively improves accuracy of the obtained maximum allowed height, thereby improving driving performance. In particular, when the height determining method is applied to intelligent driving or automated driving, a maximum allowed height of a road is automatically determined, so that timely and correct decision control can be made based on the determined maximum allowed height of the road. This effectively improves safety of road driving.

In a possible implementation, the target object includes at least one of a height restriction barrier, underbridge, a tunnel entrance, and a parking barrier. This embodiment of this application herein is described by merely using an example that the target object includes at least one of a height restriction barrier, an underbridge, a tunnel entrance, and a parking barrier, but this does not mean that this embodiment of this application is limited thereto.

In a possible implementation, the determining a height threshold of the road based on the target object may include:
  determining height information displayed on the target object as the height threshold. Because the height information displayed on the target object is an accurate height threshold measured by a professional, the height threshold of the road determined based on the height information is also accurate. This improves accuracy of the obtained maximum allowed height.

In a possible implementation, the determining a height threshold of the road based on the target object may include:
  determining the height threshold of the road based on the target object and lane information of the road.

In a possible implementation, the lane information includes a quantity of lanes and a width of each lane, and the determining the height threshold of the road based on the target object and lane information of the road may include:
  determining a total width of the road based on the target object and a total width of the lanes, where the total width of the lanes is determined based on the quantity of lanes and the width of each lane; and determining the height threshold of the road based on the total width of the road.

In a possible implementation, the determining the height threshold of the road based on the total width of the road may include:

determining the height threshold of the road based on the total width of the road and a spatial parameter, where the spatial parameter is used to indicate a width-to-height ratio of road space. For example, the spatial parameter may be represented by a bounding box (bounding box) of the road clearance (clearance). It can be understood that the bounding box of the road clearance is only a possible realization form of the spatial parameter used to indicate the width-to-height ratio of the road space, but the form is not limited to the bounding box of the road clearance.

During determining of the height threshold of the road, the total width of the road is first determined based on the target object and the total width of the lanes, and the height threshold of the road is determined based on the total width of the road and the spatial parameter used to indicate the width-to-height ratio of the road space. Because the calculated total width of the road is highly accurate and the spatial parameter is also accurate, the height threshold of the road determined based on the total width of the road and the spatial parameter used to indicate the width-to-height ratio of the road space is also accurate. This improves accuracy of the obtained maximum allowed height.

In a possible implementation, the determining a total width of the road based on the target object and a total width of the lanes may include:

determining the total width of the road based on a first positional relationship and the total width of the lanes, where the first positional relationship is used to indicate a positional relationship between support parts of the target object and lane lines on two edge sides of the road.

In a possible implementation, the determining the total width of the road based on a first positional relationship and the total width of the lanes may include:

determining the total width of the lanes as the total width of the road if the first positional relationship indicates that the support parts of the target object are disposed at positions of the lane lines on the two edge sides, indicating that a width area occupied by the lanes in a transverse direction is an entire width area of the road in the transverse direction; or determining the total width of the road based on the total width of the lanes and widths between the support parts of the target object and the lane lines on the two edge sides if the first positional relationship indicates that the support parts of the target object are disposed at positions outside the lane lines on the two edge sides, indicating that a width area occupied by the lanes in a transverse direction is a part of an entire width area of the road in the transverse direction. For example, the total width of the road is a sum of the total width of the lanes and the widths between the support parts of the target object and the lane lines on the two edge sides, thereby obtaining the total width of the road.

In a possible implementation, the height determining method may further include:

if a height of a current vehicle is less than the height threshold of the road, outputting first prompt information, where the first prompt information is used to indicate the vehicle to drive normally; or if the height of the current vehicle is greater than the height threshold of the road, outputting second prompt information, where the second prompt information is used to indicate the vehicle to stop driving, thereby providing a driving basis for vehicle driving and improving safety of vehicle driving.

According to a second aspect, an embodiment of this application further provides a height determining apparatus. The height determining apparatus may include:

a processing unit, configured to determine a target object on a road; and determine a height threshold of the road based on the target object, where the height threshold is used to indicate a maximum allowed height of the road.

In a possible implementation, the target object includes at least one of a height restriction barrier, an underbridge, a tunnel entrance, and a parking barrier.

In a possible implementation, the processing unit is specifically configured to determine height information displayed on the target object as the height threshold.

In a possible implementation, the processing unit is specifically configured to determine the height threshold of the road based on the target object and lane information of the road.

In a possible implementation, the lane information includes a quantity of lanes and a width of each lane. The processing unit is specifically configured to: determine a total width of the road based on the target object and a total width of the lanes; and determine the height threshold of the road based on the total width of the road, where the total width of the lanes is determined based on the quantity of lanes and the width of each lane.

In a possible implementation, the processing unit is specifically configured to determine the height threshold of the road based on the total width of the road and a spatial parameter, where the spatial parameter is used to indicate a width-to-height ratio of road space.

In a possible implementation, the processing unit is specifically configured to determine the total width of the road based on a first positional relationship and the total width of the lanes, where the first positional relationship is used to indicate a positional relationship between support parts of the target object and lane lines on two edge sides of the road.

In a possible implementation, the processing unit is specifically configured to: determine the total width of the lanes as the total width of the road if the first positional relationship indicates that the support parts of the target object are disposed at positions of the lane lines on the two edge sides; or determine the total width of the road based on the total width of the lanes and widths between the support parts of the target object and the lane lines on the two edge sides if the first positional relationship indicates that the support parts of the target object are disposed at positions outside the lane lines on the two edge sides.

In a possible implementation, the total width of the road is a sum of the total width of the lanes and the widths between the support parts of the target object and the lane lines on the two edge sides.

In a possible implementation, the height determining apparatus may further include an output unit.

The output unit is configured to: if a height of a current vehicle is less than the height threshold of the road, output first prompt information, where the first prompt information is used to indicate the vehicle to drive normally; or if the height of the current vehicle is greater than the height threshold of the road, output second prompt information, where the second prompt information is used to indicate the vehicle to stop driving.

According to a third aspect, an embodiment of this application further provides a height determining apparatus. The height determining apparatus may include at least one processor and at least one memory.

The memory is configured to store program instructions; and the processor is configured to execute the program instructions in the memory to enable the apparatus to perform the height determining method according to any one of the possible implementations of the first aspect.

According to a fourth aspect, an embodiment of this application further provides a computer storage medium, including instructions. When the instructions are run by one or more processors, a communication apparatus is enabled to perform the height determining method according to any one of the possible implementations of the first aspect.

According to a fifth aspect, an embodiment of this application further provides a chip, on which a computer program is stored. When the computer program is executed by a processor, the height determining method according to any one of the possible implementations of the first aspect is performed.

According to a sixth aspect, an embodiment of this application further provides a vehicle. The vehicle includes a vehicle body and the height determining apparatus according to any one of the possible implementations of the second aspect, where the height determining apparatus is independently disposed in the vehicle body. For example, the vehicle may include a camera lens, a control module, or a fusion module. Correspondingly, the height determining apparatus may alternatively be integrated in the camera lens. Alternatively, the height determining apparatus is integrated in the control module. Alternatively, the height determining apparatus is integrated in the fusion module. For example, the control module may be a central controller or a multi domain controller (multi domain controller, MDC).

According to the height determining method and apparatus provided in embodiments of this application, the method includes: first determining the target object on the road, and determining the height threshold of the road based on the target object, to obtain the maximum allowed height of the road. Compared with a conventional technology in which a millimeter-wave radar with limited detection precision is used and cannot obtain an accurate maximum allowed height, the method in the embodiments of this application effectively improves accuracy of the obtained maximum allowed height, thereby improving driving performance. In particular, when the method is applied to intelligent driving or automated driving, a maximum allowed height of a road is automatically determined, so that timely and correct decision control can be made based on the determined maximum allowed height of the road. This effectively improves safety of road driving.

DESCRIPTION OF EMBODIMENTS

Embodiments of this application can be applied to manual driving, an assisted driving system, an automated driving system, a possible future driving system, or the like. Embodiments of this application are not limited thereto.

Figure 1:
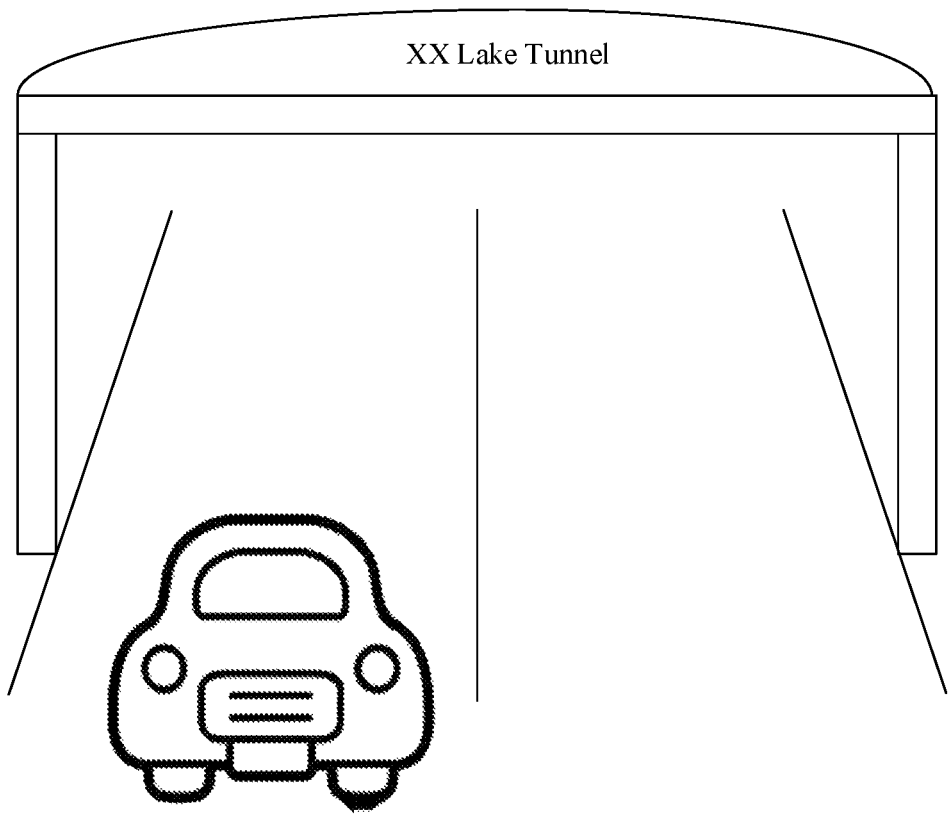
FIG. 1 is a schematic diagram of an application scenario according to an embodiment of this application.

FIG. 1 is a schematic diagram of an application scenario according to an embodiment of this application. In a driving process, if a vehicle needs to pass through special road sections such as a height restriction barrier, an underbridge, and a tunnel entrance, it is usually necessary to determine a maximum allowed height of the road, to provide the maximum allowed height as a driving basis for the vehicle. During determining of the maximum allowed height of the road, a millimeter-wave radar disposed in the vehicle collects reflection point data. If the data used to calculate the maximum allowed height of the road includes ineffective reflection point data, accuracy of the calculated maximum allowed height of the road is low. In addition, even if all of the data used to calculate the maximum allowed height of the road is effective reflection point data, accuracy of the calculated maximum allowed height of the road may also be low due to limited detection precision of the millimeter-wave radar.

Figure 2:
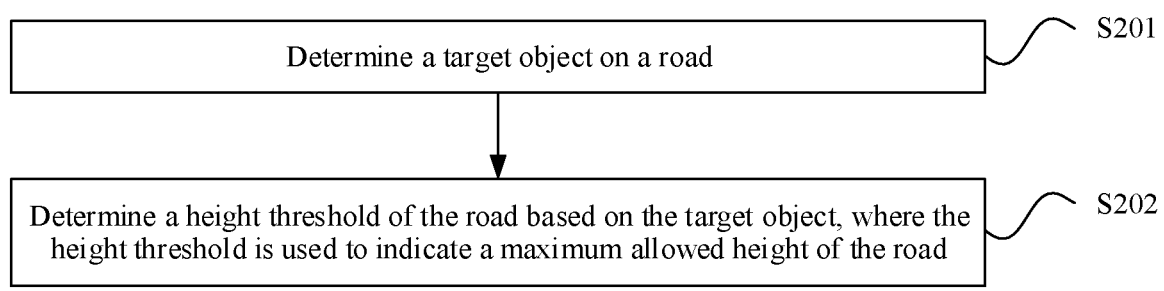
FIG. 2 is a schematic flowchart of a height determining method according to an embodiment of this application.

Therefore, during determining of a maximum allowed height of a road, embodiments of this application provide a height determining method to improve accuracy of an obtained maximum allowed height. The method is different from a conventional technology in the following: A millimeter-wave radar is no longer disposed in a vehicle to collect reflection point data. Instead, a camera is disposed in the vehicle to collect image data of the road, to determine a height threshold of the road based on the image data. The height threshold is used to indicate a maximum allowed height of the road. It can be understood that during collection of image data of the road, a specific frame of image data of the road may be collected, or a plurality of frames of image data of the road may be collected. A quantity of image frames is not limited herein. For example, FIG. 2 is a schematic flowchart of a height determining method according to an embodiment of this application, which is applied to a camera. The camera may include a camera lens and a sensing module. The height determining method may include at least one of the following steps. It should be noted herein that interaction between the sensing module and a control module is used as an example in the following description, but a person skilled in the art can learn that the sensing module and the control module may be a logical functional division, which is convenient for understanding of the solution. In specific implementation, corresponding steps and functions may be completed by any type or quantity of functional units or hardware entity units, and are not limited to the logical division of the sensing module and the control module.

S201: Determine a target object on a road.

For example, the target object includes at least one of a height restriction barrier, an underbridge, a tunnel entrance, and a parking barrier.

It should be noted that in this embodiment of this application, the target object may be understood as an object for determining a road clearance (clearance), for example, a height restriction barrier, a rectangular underbridge, a rectangular tunnel entrance, or a parking barrier. The target object may alternatively be understood as some objects by which the road clearance cannot be determined, for example, an arched underbridge or an arched tunnel entrance. This embodiment of this application herein is described by merely using an example that the target object may include at least one of a height restriction barrier, an underbridge, a tunnel entrance, and a parking barrier, but this does not mean that this embodiment of this application is limited thereto.

When determining the target object on the road, the camera lens in the camera may first collect image data of the road, and send the collected image data of the road to the sensing module in the camera, so that the sensing module can detect the target object in the obtained image data of the road, and determine whether the image data of the road includes the target object. For example, the sensing module may be a sensing chip. If it is determined that the image data of the road does not include the target object, it indicates that the current road is an ordinary road section. In this case, the vehicle can continue to travel without further determining a height threshold of the road. On the contrary, if it is determined that the image data of the road includes the target object, it indicates that the current road is a special road section, and a height threshold of the special road section may affect following driving of the vehicle. Therefore, it is necessary to further determine the height threshold of the road, that is, to perform the following S202.

S202: Determine a height threshold of the road based on the target object.

The height threshold is used to indicate a maximum allowed height of the road. It can be understood that in this embodiment of this application, the maximum allowed height can be understood as a maximum height for allowing the vehicle to travel on the road. If a height of the vehicle is lower than the maximum height, it means that the vehicle can continue to travel on the road, for the maximum height will not affect normal driving of the vehicle. On the contrary, if the height of the vehicle is higher than the maximum height, it means that the vehicle cannot continue to travel on the road, for the maximum height will seriously affect normal driving of the vehicle.

It can be learned that, during determining of the height threshold of the road in this embodiment of this application, the target object on the road is first determined, and the height threshold of the road is determined based on the target object, to obtain the maximum allowed height of the road. Compared with a conventional technology in which a millimeter-wave radar with limited detection precision is used and cannot obtain an accurate maximum allowed height, the height determining method effectively improves accuracy of the obtained maximum allowed height.

Based on the embodiment shown in FIG. 2, during determining of the height threshold of the road based on the target object in S202, there are at least two possible implementations for determining the height threshold of the road. In one possible implementation, the height threshold of the road may be determined directly based on height information displayed on the target object. In the other possible implementation, the height threshold of the road may be determined based on the target object and lane information of the road. It may be understood that the foregoing two possible implementations are merely used as examples for description in this embodiment of this application, but this does not mean that this embodiment of this application is limited thereto. The following describes in detail the technical solutions of the height determining method provided by embodiments of this application with reference to the two possible implementations respectively.

Figure 3:
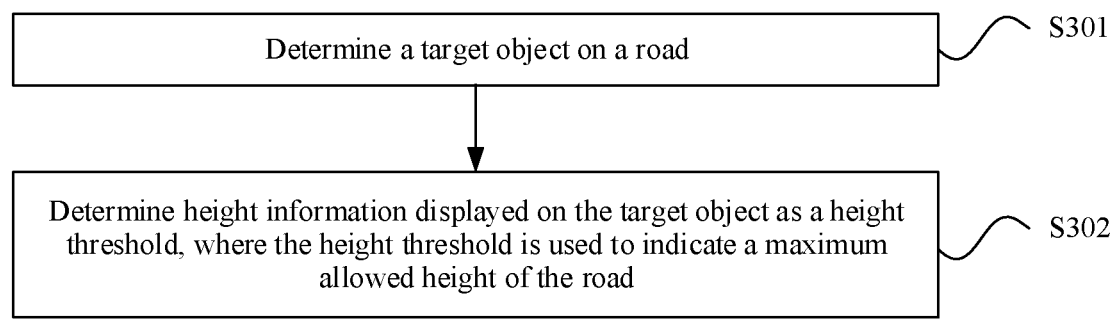
FIG. 3 is a schematic flowchart of a height determining method according to an embodiment of this application.

In one possible implementation, the height threshold of the road is determined directly based on the height information displayed on the target object. For example, FIG. 3 is a schematic flowchart of a height determining method according to an embodiment of this application. The height determining method may include the following steps:

S301: Determine a target object on a road.

For example, the target object includes at least one of a height restriction barrier, an underbridge, a tunnel entrance, and a parking barrier.

It should be noted that specific descriptions of determining the target object on the road in S301 are similar to the specific descriptions of determining the target object on the road in S201. For details, refer to the specific descriptions of determining the target object on the road in S201. Details are not described in this embodiment of this application again.

S302: Determine height information displayed on the target object as a height threshold.

The height threshold is used to indicate a maximum allowed height of the road.

Figure 4:
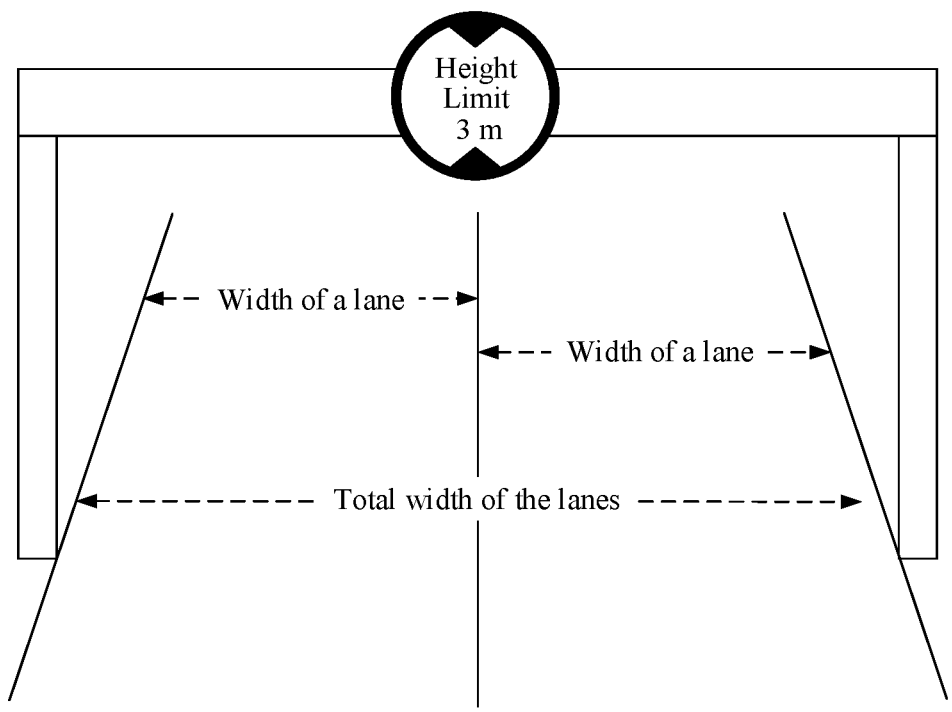
FIG. 4 is a schematic diagram of a road section with a height restriction barrier according to an embodiment of this application.

That the target object is a height restriction barrier is used as an example. FIG. 4 is a schematic diagram of a road section with a height restriction barrier according to an embodiment of this application. If it is detected that image data collected by a camera lens includes the target object, that is, the height restriction barrier, it indicates that a height restriction barrier is disposed on the road ahead, that is, the vehicle is about to pass through a road section with a height restriction barrier. In this case, a height threshold of the road with the height restriction barrier may be obtained first. A height restriction sign with height information is usually placed on the height restriction barrier. As shown in FIG. 4, height information indicated by the height barrier sign on the height restriction barrier is 3 m. The height information is used to indicate a maximum height for allowing a vehicle to travel on the road. Therefore, the height information displayed on the height restriction barrier can be directly determined as the height threshold of the road. In other words, the height threshold of the road is 3 m. In this way, the maximum allowed height of the road is obtained.

It can be learned that in this possible implementation, during determining of the height threshold of the road, the height information displayed on the target object is directly determined as the height threshold of the road. Because the height information displayed on the target object is an accurate height threshold measured by a professional, the height threshold of the road determined based on the height information is also accurate. This improves accuracy of the obtained maximum allowed height.

The foregoing embodiment shown in FIG. 3 describes in detail the technical solution in one possible implementation in which the height information displayed on the target object can be directly used as the height threshold to determine the maximum allowed height of the road. The following describes in detail, with reference to the other possible implementation, a technical solution of how to determine the height threshold of the road based on the target object and lane information of the road.

Figure 5:
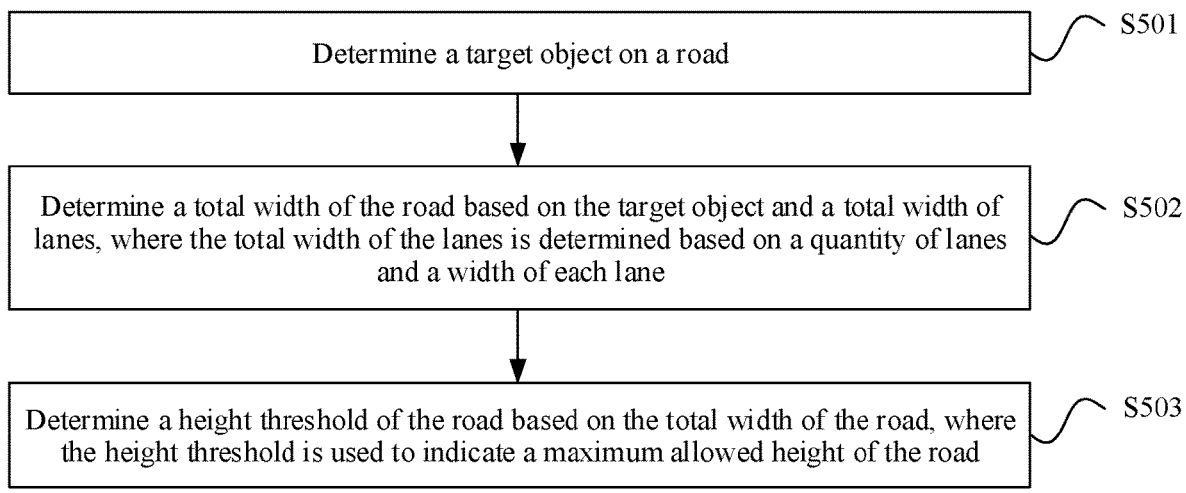
FIG. 5 is a schematic flowchart of a height determining method according to an embodiment of this application.

In the other possible implementation, the height threshold of the road is determined based on the target object and the lane information of the road. The lane information includes a quantity of lanes and a width of each lane. For example, FIG. 5 is a schematic flowchart of a height determining method according to an embodiment of this application. The height determining method may include the following steps:

S501: Determine a target object on a road.

For example, the target object includes at least one of a height restriction barrier, an underbridge, a tunnel entrance, and a parking barrier.

It should also be noted that specific descriptions of determining the target object on the road in S501 are similar to the specific descriptions of determining the target object on the road in S201. For details, refer to the specific descriptions of determining the target object on the road in S201. Details are not described in this embodiment of this application again.

It can be understood that, if it is detected that image data collected by a camera lens includes the target object and the target object is marked with height information of the road, the marked height information of the road can be directly determined as the height threshold of the road, corresponding to the technical solution in the embodiment shown in FIG. 2. On the contrary, if it is detected that the image data collected by the camera lens includes the target object but the target object is not marked with height information of the road, it is necessary to determine a total width of the road based on the target object and a total width of the lanes, and determine the height threshold of the road based on the total width of the road, that is, to perform the following S502 and S503.

S502: Determine a total width of the road based on the target object and a total width of the lanes.

The total width of the lanes is determined based on the quantity of lanes and the width of each lane. As shown in FIG. 4, an area occupied by the lanes is an area between lane lines on two edge sides of the road.

For example, determining of the total width of the road based on the total width of the lanes is related to a positional relationship between support parts of the target object and the lane lines on the two edge sides of the road. In other words, the height threshold of the road may be determined based on a first positional relationship and the total width of the road. The first positional relationship is used to indicate the positional relationship between the support parts of the target object and the lane lines on the two edge sides of the road.

Figure 6:
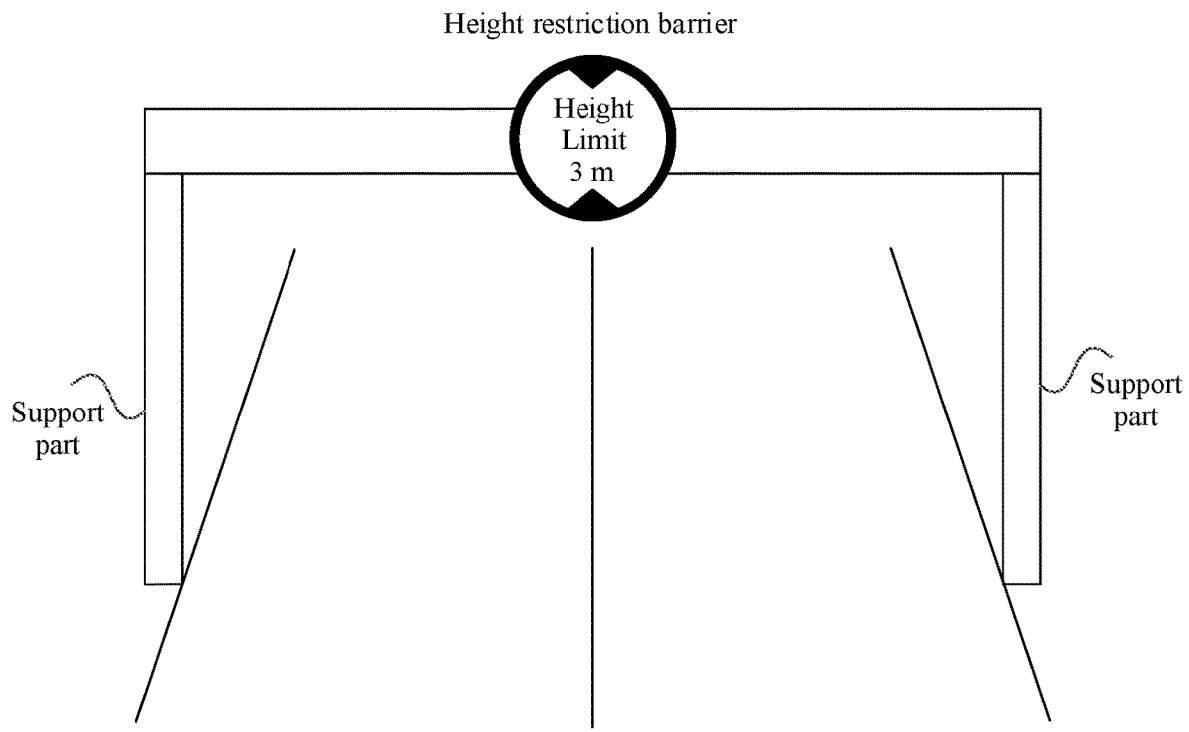
FIG. 6 is a schematic diagram of a height restriction barrier according to an embodiment of this application.
Figure 7:
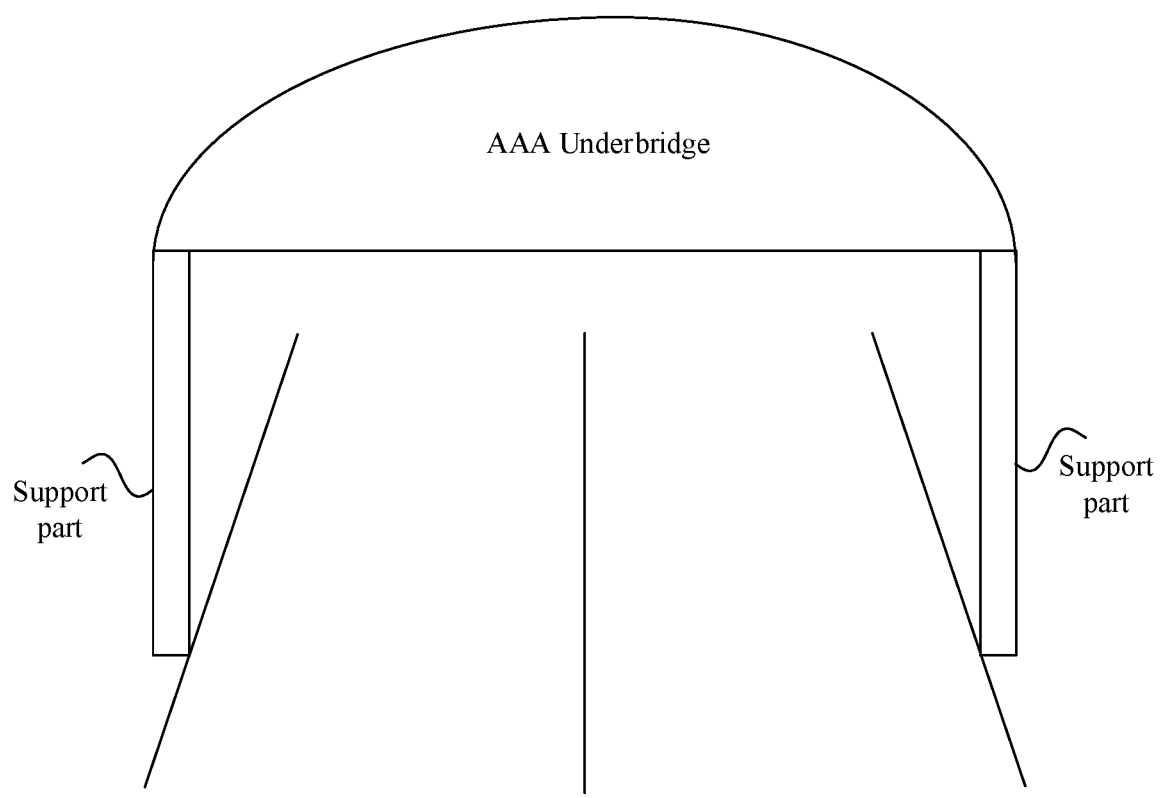
FIG. 7 is a schematic diagram of a rectangular underbridge according to an embodiment of this application.
Figure 8:
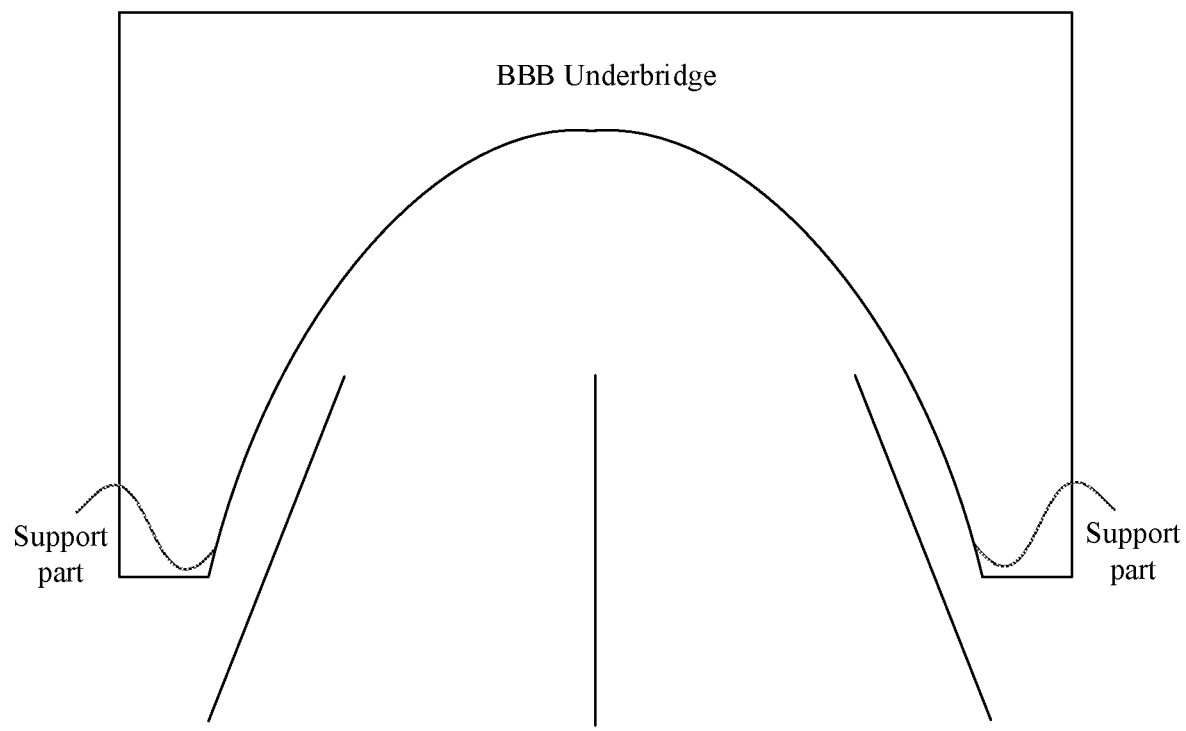
FIG. 8 is a schematic diagram of an arched underbridge according to an embodiment of this application.

The following describes the support parts of the target object by using different target objects as examples for better understanding. For example, the target object is a height restriction barrier. FIG. 6 is a schematic diagram of a height restriction barrier according to an embodiment of this application. Support parts of the height restriction barrier are two upright poles of the height restriction barrier in a vertical direction. For example, the target object is a rectangular underbridge. FIG. 7 is a schematic diagram of a rectangular underbridge according to an embodiment of this application. Support parts of the rectangular underbridge are two upright columns of the rectangular underbridge in a vertical direction. For example, the target object is an arched underbridge. FIG. 8 is a schematic diagram of an arched underbridge according to an embodiment of this application. Support parts of the arched underbridge are support parts of the arched underbridge in a vertical direction, which are used to support the arched underbridge and are close to the ground. It can be understood that when the target object is a rectangular tunnel entrance, support parts of the rectangular tunnel entrance are two upright columns of the rectangular tunnel entrance in a vertical direction, which are similar to the support parts of the rectangular underbridge, as shown in FIG. 7. When the target object is an arched tunnel entrance, support parts of the arched tunnel entrance are support parts of the arched tunnel entrance in a vertical direction, which are used to support the arched tunnel entrance and are close to the ground. These support parts are similar to the support parts of the arched underbridge, as shown in FIG. 8.

It can be learned that before determining the total width of the road based on the total width of the lanes, it is necessary to determine the total width of the lanes based on lane information. For example, during calculation of the total width of the lanes based on the lane information, if widths of the lanes are the same, a product of the width of the lane and the quantity of lanes can be calculated to obtain the total width of the lanes. If the widths of the lanes are different, a sum of the widths of the lanes is calculated to obtain the total width of the lanes. After calculation of the total width of the lanes, the total width of the road can be determined based on the total width of the lanes and the first positional relationship indicating the positional relationship between the support parts of the target object and the lane lines on the two edge sides of the road. There may be two possible scenarios. In one possible scenario, if the first positional relationship indicates that the support parts of the target object are disposed at positions of the lane lines on the two edge sides, the total width of the lanes is determined as the total width of the road. For example, it can be learned from FIG. 7 that a width area occupied by the lanes in a transverse direction is an entire width area of the road in the transverse direction. Therefore, the total width of the lanes can be directly determined as the total width of the road. In this way, the total width of the road is obtained. In the other possible implementation, if the first positional relationship indicates that the support parts of the target object are disposed at positions outside the lane lines on the two edge sides, the total width of the road may be determined based on the total width of the lanes and widths between the support parts of the target object and the lane lines on the two edge sides. For example, it can be learned from FIG. 8 that a width area occupied by the lanes in a transverse direction is a part of an entire width area of the road in the transverse direction. Therefore, a sum of the total width of the lanes and the widths between the support parts of the target object and the lane lines on the two edge sides may be calculated, and the sum may be determined as the total width of the road. In this way, the total width of the road is obtained.

After the total width of the road is calculated, the height threshold used to indicate the maximum allowed height of the road may be further determined based on the total width of the road, that is, the following S503 is performed.

S503: Determine a height threshold of the road based on the total width of the road.

For example, during determining the height threshold of the road based on the total width of the road, the height threshold of the road may be determined based on the total width of the road and a spatial parameter. The spatial parameter is used to indicate a width-to-height ratio of road space, that is, a ratio of a width of the road space in a transverse direction to a height thereof in a vertical direction. For example, the spatial parameter may be represented by a bounding box (bounding box) of a road clearance (clearance). It can be understood that the bounding box of the road clearance is only a possible realization form of the spatial parameter used to indicate the width-to-height ratio of the road space, but the form is not limited to the bounding box of the road clearance.

Figure 9:
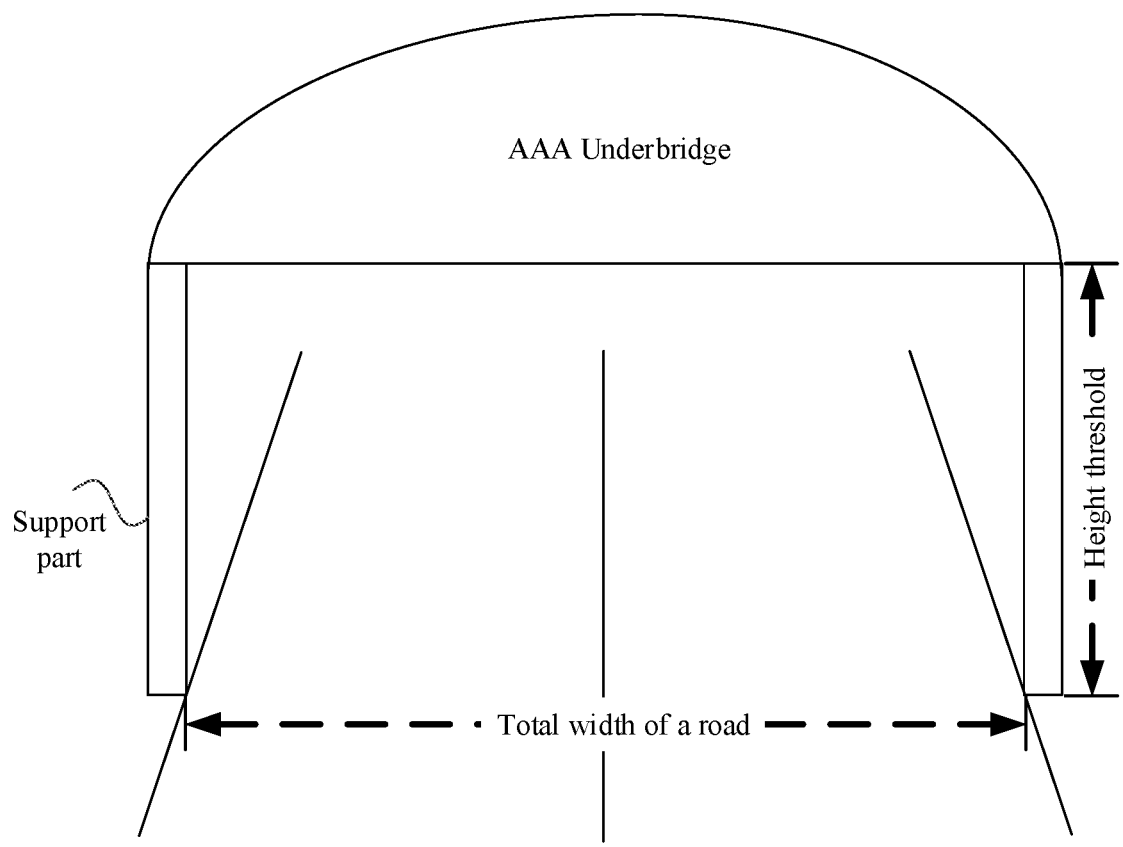
FIG. 9 is a schematic diagram of a total width of a road and a height threshold of the road according to an embodiment of this application.
Figure 10:
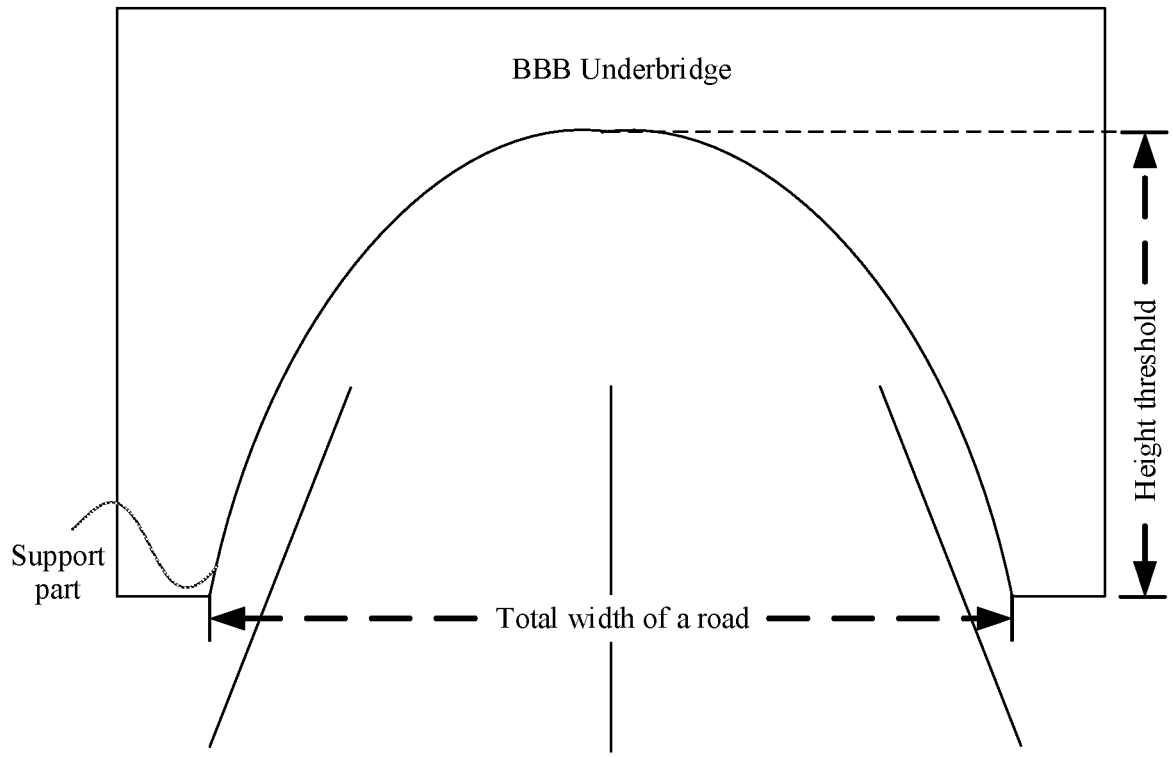
FIG. 10 is another schematic diagram of a total width of a road and a height threshold of the road according to an embodiment of this application.

For example, the support parts of the target object are disposed at the positions of the lane lines on the two edge sides. FIG. 9 is a schematic diagram of a total width of a road and a height threshold of the road according to an embodiment of this application. A height threshold of the road in a vertical direction can be obtained based on the total width of the road in a transverse direction and a bounding box of a road clearance. For another example, the support parts of the target object are disposed at positions outside the lane lines on the two edge sides. FIG. 10 is another schematic diagram of a total width of a road and a height threshold of the road according to an embodiment of this application. Similarly, a height threshold of the road in a vertical direction can be obtained based on the total width of the road in a transverse direction and a bounding box of a road clearance.

Notably, it can be learned from FIG. 9 and FIG. 10 that in this embodiment of this application, the height threshold of the road determined based on the total width of the road refers to a maximum allowed height of the road, rather than a height of the outermost bounding box of the target object.

It can be learned that in this possible implementation, during determining of the height threshold of the road, the total width of the road is determined based on the target object and the total width of the lanes, and the height threshold of the road is determined based on the total width of the road and the spatial parameter used to indicate the width-to-height ratio of the road space. Because the calculated total width of the road is highly accurate and the spatial parameter is also accurate, the height threshold of the road determined based on the total width of the road and the spatial parameter used to indicate the width-to-height ratio of the road space is also accurate. This improves accuracy of the obtained maximum allowed height.

Figure 11:
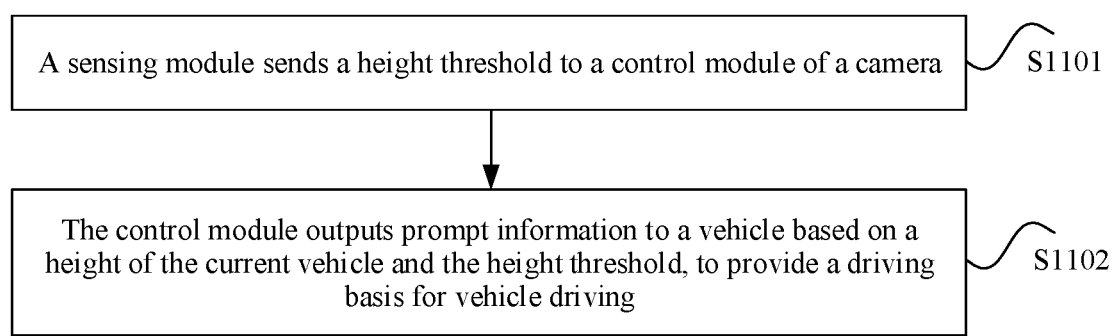
FIG. 11 is a schematic flowchart of another height determining method according to an embodiment of this application.

It can be understood that after the height threshold of the road is determined by using the method shown in any one of the foregoing embodiments, a driving basis may be provided for the vehicle based on the height threshold. For example, the camera may further include a control module. After a sensing module determines the height threshold of the road, the sensing module sends the height threshold to the control module. Correspondingly, the control module can provide a driving basis for the vehicle based on the height threshold. For example, the control module may be a control chip. FIG. 11 is a schematic diagram of another height determining method according to an embodiment of this application. The height determining method may further include the following steps.

S1101: The sensing module sends the height threshold to the control module of the camera.

For example, when sending the height threshold of the road to the control module of the camera, the sensing module may add a signal (signal) to describe the height threshold of the road without changing a current standard interface. It can be understood that adding a signal to describe the height threshold of the road in the current standard interface also falls in the protection scope of this application.

For example, the current standard interface is ISO 23150. A signal may be added to a general landmark object bounding box (general landmark object bounding box) in the current standard interface ISO 23150 to describe the height threshold of the road. For example, the signal may be a general landmark object bounding box clearance (General landmark object bounding box clearance). As shown in Table 1 below, a field for a height threshold of a road is added to send the height threshold of the road to the control module.

TABLE 1

| General landmark object bounding box | General landmark object bounding box clearance | 0 | Constraint: B.1.1 |
|---|---|---|---|

The added general landmark object bounding box clearance may be represented by a name, a description, and a value type. For example, refer to Table 2 below.

TABLE 2

| Name | General landmark object bounding box clearance | | |
|---|---|---|---|
| Description | [0 . . . ] Floating-point value | | |
| Value type | [0 . . . ] Floating-point value | Unit | [m] |

It can be learned that in this embodiment of this application, the sensing module may send the calculated height threshold of the road to the control module by adding the signal, that is, the general landmark object bounding box clearance, so that the control module may further compare a height of a current vehicle with the height threshold to provide a driving basis for vehicle driving through prompt information, that is, perform the following S1102.

S1102: The control module outputs prompt information to the vehicle based on a height of a current vehicle and the height threshold, to provide a driving basis for vehicle driving.

For example, the prompt information may be voice prompt information, text prompt information, and certainly may be image prompt information, which may be set according to an actual need. It can be understood that, the prompt information may be voice prompt information to avoid impact on user's driving, that is, the prompt information is output to the user via a voice. This can avoid impact on user's driving caused by viewing the text information by the user, thereby improving user experience.

It should be noted that in this embodiment of this application, that the control module is the control module in the camera is merely used as an example. Certainly, the control module may alternatively be a control module in the vehicle, which may be specifically set according to an actual need.

Figure 12:
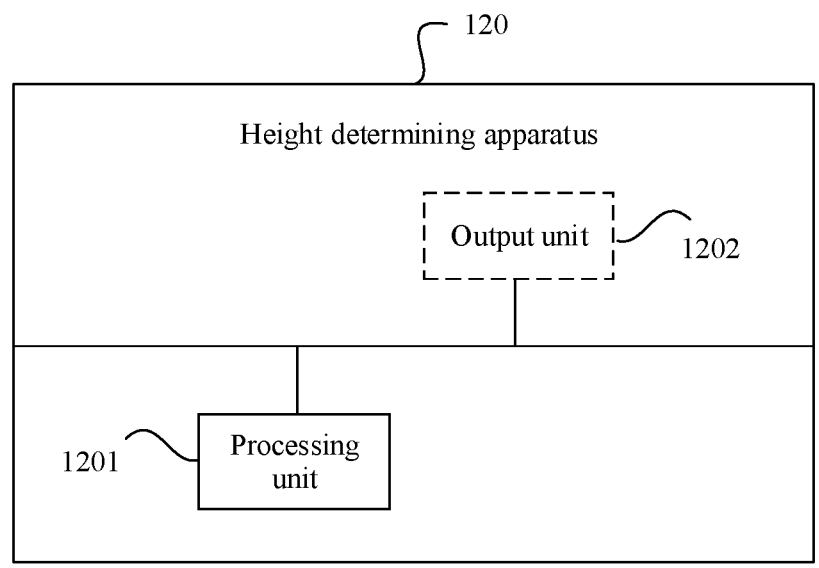
FIG. 12 is a schematic diagram of a structure of a height determining apparatus according to an embodiment of this application.

During output of the prompt information to the vehicle based on the height of the current vehicle and the height threshold, the height of the vehicle may be first compared with the height threshold. If the height of the current vehicle is less than the height threshold of the road, first prompt information is output, where the first prompt information is used to indicate the vehicle to drive normally. On the contrary, if the height of the current vehicle is greater than the height threshold of the road, second prompt information is output, where the second prompt information is used to indicate the vehicle to stop driving. This provides a driving basis for vehicle driving and improves safety of vehicle driving.

FIG. 12 is a schematic diagram of a structure of a height determining apparatus 120 according to an embodiment of this application. For example, referring to FIG. 12, the height determining apparatus 120 may include:

a processing unit 1201, configured to: determine a target object on a road; and determine a height threshold of the road based on the target object, where the height threshold is used to indicate a maximum allowed height of the road.

Optionally, the target object includes at least one of a height restriction barrier, an underbridge, a tunnel entrance, and a parking barrier.

Optionally, the processing unit 1201 is specifically configured to determine height information displayed on the target object as the height threshold.

Optionally, the processing unit 1201 is specifically configured to determine the height threshold of the road based on the target object and lane information of the road.

Optionally, the lane information includes a quantity of lanes and a width of each lane. The processing unit 1201 is specifically configured to: determine a total width of the road based on the target object and a total width of the lanes; and determine the height threshold of the road based on the total width of the road, where the total width of the lanes is determined based on the quantity of lanes and the width of each lane.

Optionally, the processing unit 1201 is specifically configured to determine the height threshold of the road based on the total width of the road and a spatial parameter, where the spatial parameter is used to indicate a width-to-height ratio of road space.

Optionally, the processing unit 1201 is specifically configured to determine the total width of the road based on a first positional relationship and the total width of the lanes, where the first positional relationship is used to indicate a positional relationship between support parts of the target object and lane lines on two edge sides of the road.

Optionally, the processing unit 1201 is specifically configured to: determine the total width of the lanes as the total width of the road if the first positional relationship indicates that the support parts of the target object are disposed at positions of the lane lines on the two edge sides; or determine the total width of the road based on the total width of the lanes and widths between the support parts of the target object and the lane lines on the two edge sides if the first positional relationship indicates that the support parts of the target object are disposed outside the lane lines on the two edge sides.

Optionally, the total width of the road is a sum of the total width of the lanes and the widths between the support parts of the target object and the lane lines on the two edge sides.

Optionally, the height determining apparatus 120 may further include an output unit 1202.

The output unit 1202 is configured to: if a height of a current vehicle is less than the height threshold of the road, output first prompt information, where the first prompt information is used to indicate the vehicle to drive normally; or if the height of the current vehicle is greater than the height threshold of the road, output second prompt information, where the second prompt information is used to indicate the vehicle to stop driving.

For example, the vehicle may further include a camera lens, a control module, or a fusion module. Correspondingly, the height determining apparatus may alternatively be integrated in the camera lens in the vehicle. Alternatively, the height determining apparatus is integrated in the control module in the vehicle. Alternatively, the height determining apparatus is integrated in the fusion module in the vehicle. For example, the control module may be a central controller or an MDC. It can be understood that the height determining apparatus is disposed in the vehicle.

The height determining apparatus 120 according to this embodiment of this application can perform the height determining method in the embodiment shown in any one of the foregoing drawings. Implementation principles and beneficial effects of the height determining apparatus 120 are similar to those of the height determining method. Details are not described herein again.

Figure 13:
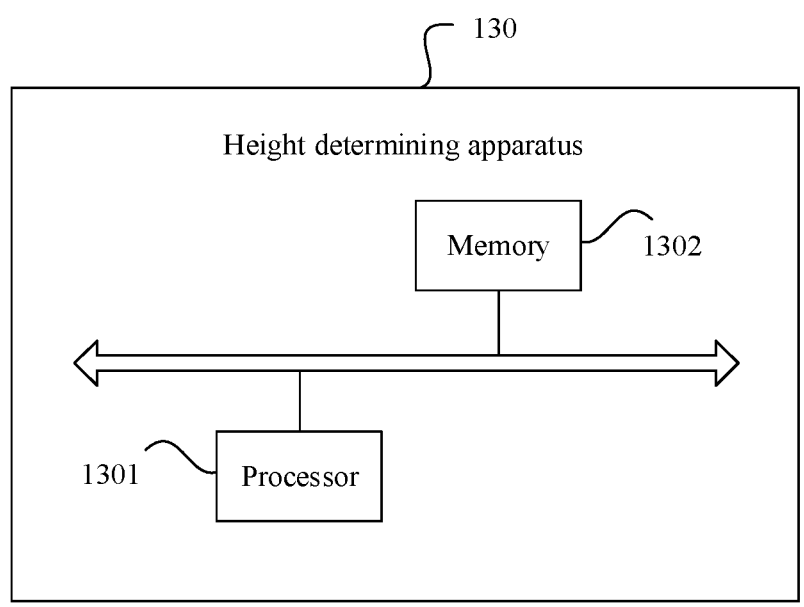
FIG. 13 is a schematic diagram of a structure of another height determining apparatus according to an embodiment of this application.

FIG. 13 is a schematic diagram of a structure of a height determining apparatus 130 according to an embodiment of this application. For example, referring to FIG. 13, the height determining apparatus 130 may include at least one processor 1301 and at least one memory 1302.

The memory 1302 is configured to store program instructions.

The processor 1301 is configured to execute the program instructions in the memory 1302 to enable the height determining apparatus 130 to perform the height determining method in the embodiment shown in any one of the foregoing drawings. Implementation principles and beneficial effects of the height determining apparatus 130 are similar to those of the height determining method. Details are not described herein again.

An embodiment of this application further provides a chip, on which a computer program is stored. When the computer program is executed by a processor, the height determining method in the embodiment shown in any one of the foregoing drawings is performed. Implementation principles and beneficial effects of the chip are similar to those of the height determining method. Details are not described herein again.

An embodiment of this application further provides a computer storage medium, including instructions. When the instructions are executed by one or more processors, a communication apparatus is enabled to perform the height determining method in the embodiment shown in any one of the foregoing drawings. Implementation principles and beneficial effects of the computer storage medium are similar to those of the height determining method. Details are not described herein again.

An embodiment of this application further provides a vehicle. The vehicle includes a vehicle body and the height determining apparatus described in the foregoing embodiment, where the height determining apparatus is independently disposed in the vehicle body. For example, the vehicle may include a camera lens, a control module, or a fusion module. Correspondingly, the height determining apparatus may alternatively be integrated in the camera lens. Alternatively, the height determining apparatus is integrated in the control module. Alternatively, the height determining apparatus is integrated in the fusion module. For example, the control module may be a central controller or an MDC.

The processor in the foregoing embodiments may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor, or the like. The steps in the methods disclosed with reference to embodiments of this application may be directly performed by a hardware decoding processor, or may be performed by using a combination of hardware in a decoding processor and a software module. The software module may be located in a mature storage medium in the art, such as a random access memory (random access memory, RAM), a flash memory, a read-only memory (read-only memory, ROM), a programmable read-only memory, an electrically erasable programmable memory, a register, or the like. The storage medium is located in the memory, and the processor reads the instructions in the memory and performs the steps in the foregoing methods in combination with hardware of the processor.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of hardware in addition to a software functional unit.

What is claimed is:

1. A height determining method, comprising:
   determining a target object on a road; and
   determining a height threshold of the road based on the target object, wherein the height threshold indicates a maximum allowed height of the road, and wherein determining the height threshold of the road based on the target object comprises:
   determining a total width of the road based on the target object and a total width of lanes of the road, wherein the total width of the lanes is determined based on a quantity of the lanes and a width of each lane; and
   determining the height threshold of the road based on the total width of the road and a spatial parameter, wherein the spatial parameter indicates a width-to-height ratio of road space.

2. The method according to claim 1, wherein the target object comprises at least one of a height restriction barrier, an underbridge, a tunnel entrance, or a parking barrier.

3. The method according to claim 1, wherein the determining a height threshold of the road based on the target object comprises:
   determining height information displayed on the target object as the height threshold.

4. The method according to claim 1, wherein the determining a total width of the road based on the target object and a total width of the lanes comprises:
   determining the total width of the road based on a first positional relationship and the total width of the lanes, wherein the first positional relationship is used to indicate a positional relationship between support parts of the target object and lane lines on two edge sides of the road.

5. The method according to claim 4, wherein the determining the total width of the road based on a first positional relationship and the total width of the lanes comprises:
   determining the total width of the lanes as the total width of the road if the first positional relationship indicates that the support parts of the target object are disposed at positions of the lane lines on the two edge sides; or
   determining the total width of the road based on the total width of the lanes and widths between the support parts of the target object and the lane lines on the two edge sides if the first positional relationship indicates that the support parts of the target object are disposed at positions outside the lane lines on the two edge sides.

6. The method according to claim 5, wherein the total width of the road is a sum of the total width of the lanes and the widths between the support parts of the target object and the lane lines on the two edge sides.

7. The method according to claim 6, wherein the method further comprises:
   in response to determining that a height of a current vehicle is less than the height threshold of the road, outputting first prompt information, wherein the first prompt information is used to indicate the current vehicle to drive normally; or
   in response to determining that the height of the current vehicle is greater than the height threshold of the road, outputting second prompt information, wherein the second prompt information is used to indicate the current vehicle to stop driving.

8. An apparatus, comprising:
   one or more processors, and one or more memories including computer-executable instructions that, when executed by the one or more processors, cause the apparatus to perform operations comprising:
   determining a target object on a road; and
   determining a height threshold of the road based on the target object, wherein the height threshold is used to indicate a maximum allowed height of the road, and wherein determining the height threshold of the road based on the target object comprises:
   determining a total width of the road based on the target object and a total width of lanes of the road, wherein the total width of lanes is determined based on a quantity of the lanes and a width of each lane; and
   determining the height threshold of the road based on the total width of the road and a spatial parameter, wherein the spatial parameter indicates a width-to-height ratio of road space.

9. The apparatus according to claim 8, wherein the target object comprises at least one of a height restriction barrier, an underbridge, a tunnel entrance, and a parking barrier.

10. The apparatus according to claim 8, wherein the operations further comprise:
    determining height information displayed on the target object as the height threshold.

11. The apparatus according to claim 8, wherein the operations further comprise:

determining the total width of the road based on a first positional relationship and the total width of the lanes, wherein the first positional relationship is used to indicate a positional relationship between support parts of the target object and lane lines on two edge sides of the road.

12. The apparatus according to claim 11, wherein the operations further comprise:

determining the total width of the lanes as the total width of the road if the first positional relationship indicates that the support parts of the target object are disposed at positions of the lane lines on the two edge sides; or determining the total width of the road based on the total width of the lanes and widths between the support parts of the target object and the lane lines on the two edge sides if the first positional relationship indicates that the support parts of the target object are disposed at positions outside the lane lines on the two edge sides.

13. The apparatus according to claim 12, wherein the total width of the road is a sum of the total width of the lanes and the widths between the support parts of the target object and the lane lines on the two edge sides.

14. A non-transitory computer readable medium storing one or more programming instructions executable by one or more processors to cause the one or more processors to perform operations comprising:

determining a target object on a road; and determining a height threshold of the road based on the target object, wherein the height threshold is used to indicate a maximum allowed height of the road, and wherein determining the height threshold of the road based on the target object comprises:

determining a total width of the road based on the target object and a total width of lanes of the road, wherein the total width of lanes is determined based on a quantity of the lanes and a width of each lane; and determining the height threshold of the road based on the total width of the road and a spatial parameter, wherein the spatial parameter indicates a width-to-height ratio of road space.

15. The non-transitory computer readable medium according to claim 14, wherein the target object comprises at least one of a height restriction barrier, an underbridge, a tunnel entrance, or a parking barrier.

16. The non-transitory computer readable medium according to claim 14, wherein the determining a height threshold of the road based on the target object comprises:

determining height information displayed on the target object as the height threshold.

17. The non-transitory computer readable medium according to claim 14, wherein the determining a total width of the road based on the target object and a total width of the lanes comprises:

determining the total width of the road based on a first positional relationship and the total width of the lanes, wherein the first positional relationship is used to indicate a positional relationship between support parts of the target object and lane lines on two edge sides of the road.

18. The non-transitory computer readable medium according to claim 17, wherein the determining the total width of the road based on a first positional relationship and the total width of the lanes comprises:

determining the total width of the lanes as the total width of the road if the first positional relationship indicates that the support parts of the target object are disposed at positions of the lane lines on the two edge sides; or determining the total width of the road based on the total width of the lanes and widths between the support parts of the target object and the lane lines on the two edge sides if the first positional relationship indicates that the support parts of the target object are disposed at positions outside the lane lines on the two edge sides.

19. The non-transitory computer readable medium according to claim 18, wherein the total width of the road is a sum of the total width of the lanes and the widths between the support parts of the target object and the lane lines on the two edge sides.

20. The non-transitory computer readable medium according to claim 19, wherein the operations further comprise:

in response to determining that a height of a current vehicle is less than the height threshold of the road, outputting first prompt information, wherein the first prompt information is used to indicate the current vehicle to drive normally; or in response to determining that the height of the current vehicle is greater than the height threshold of the road, outputting second prompt information, wherein the second prompt information is used to indicate the current vehicle to stop driving.

\* \* \* \* \*